(12) United States Patent
Bolles et al.

(10) Patent No.: US 9,151,672 B2
(45) Date of Patent: Oct. 6, 2015

(54) OPTICAL ABSORPTION SPECTROMETRY SYSTEM INCLUDING DICHROIC BEAM COMBINER AND SPLITTER

(71) Applicant: AGILENT TECHNOLOGIES, INC., Loveland, CO (US)

(72) Inventors: Michael Bolles, St Kilda (AU); Michael Ron Hammer, Sassafras (AU)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/085,840

(22) Filed: Nov. 21, 2013

(65) Prior Publication Data

US 2015/0138533 A1 May 21, 2015

(51) Int. Cl.
*G01J 3/28* (2006.01)
*G01J 3/427* (2006.01)

(52) U.S. Cl.
CPC ....................................... *G01J 3/427* (2013.01)

(58) Field of Classification Search
CPC .................. G01J 3/02; G01J 3/28; G01J 3/18; G01J 3/42; G01J 3/513; G01J 3/447; G01J 3/46; G01J 3/51; G01N 21/211; G01N 21/00
USPC .......................................... 356/300–416, 445
See application file for complete search history.

(56) References Cited

U.S. PATENT DOCUMENTS

| | | | |
|---|---|---|---|
| 4,707,133 A * | 11/1987 | Roberts et al. | 356/320 |
| 6,791,676 B1 | 9/2004 | Meller | |
| 8,064,053 B2 | 11/2011 | Lee et al. | |
| 8,477,304 B2 * | 7/2013 | Bushaw et al. | 356/318 |
| 2004/0022164 A1 * | 2/2004 | Nishioka et al. | 369/112.05 |
| 2006/0197033 A1 | 9/2006 | Hairston et al. | |
| 2012/0280143 A1 | 11/2012 | Kim et al. | |
| 2013/0222789 A1 | 8/2013 | Matsui et al. | |
| 2013/0286390 A1 | 10/2013 | Bolles et al. | |

FOREIGN PATENT DOCUMENTS

| | | |
|---|---|---|
| EP | 0464495 A1 | 1/1992 |
| EP | 1111333 A1 | 6/2001 |
| JP | H0325352 A | 2/1991 |
| JP | 2010164480 A | 7/2010 |

OTHER PUBLICATIONS

GB Office Action dated Apr. 29, 2015.

* cited by examiner

*Primary Examiner* — Abdullahi Nur

(57) ABSTRACT

An optical absorption spectrometry system includes first and second light sources, a dichroic beam combiner and a wavelength selective module. The first light source emits first light having first wavelengths within a first wavelength range, and the second light source emits second light having second wavelengths within a second wavelength range different from the first wavelength range. The dichroic beam combiner includes a predetermined first reflectance/transmission transition region, the dichroic beam combiner being configured to transmit a first portion of the first light and to reflect a second portion of the second light to provide combined light. The wavelength selective module is configured to disperse the combined light received at an entrance aperture, to select a sample wavelength range of the dispersed light as sample light, and to output the sample light having the selected sample wavelength range from an exit aperture for illuminating a sample.

20 Claims, 4 Drawing Sheets

OPTICAL ABSORPTION SPECTROMETRY SYSTEM INCLUDING DICHROIC BEAM COMBINER AND SPLITTER

BACKGROUND

Generally, conventional optical absorption spectrometers use one light source, which may be selected from among multiple possible light sources and incorporated into the optical absorption spectrometry system to perform spectrochemical analysis of a particular sample. The type and characteristics of the light source selected depend on the specific wavelength and/or wavelength range of light to be used for the spectrochemical analysis.

When different experiments require different light wavelengths and/or light wavelength ranges, the light source must be physically replaced with another light source having the appropriate characteristics. This process is generally inefficient and time consuming, increasing complexity and cost, while reducing reliability. Also, when an experiment requires light wavelengths from two or more different light sources, the light source must be changed during the measurement process, typically resulting in noncontiguous results, particularly at transitions between wavelength ranges of the respective light sources.

SUMMARY

In a representative embodiment, an optical absorption spectrometry system includes a first light source configured to emit first light having first wavelengths within a first wavelength range, a second light source configured to emit second light having second wavelengths within a second wavelength range different from the first wavelength range, and a dichroic beam combiner having a predetermined first reflectance/transmission transition region. The dichroic beam combiner is configured to transmit a first portion of the first light and to reflect a second portion of the second light to provide combined light. The optical absorption spectrometry system further includes a wavelength selective module configured to disperse the combined light received at an entrance aperture, to select a sample wavelength range of the dispersed light as sample light, and to output the sample light having the selected sample wavelength range from an exit aperture for illuminating a sample.

In another representative embodiment, an optical absorption spectrometry system includes a wavelength selective module, a sample holder and a detection module. The wavelength selective module is configured to disperse combined light received at an entrance aperture, to select a sample wavelength range of the dispersed light as sample light, and to output the sample light having the selected sample wavelength range from an exit aperture. The sample holder is configured to contain a sample that provides measurement light when illuminated by the sample light from the wavelength selective module. The detection module is configured to detect the measurement light. The detection module includes multiple photodetectors configured to detect corresponding light having wavelengths within different wavelength ranges, and a dichroic beam splitter configured to transmit portions of the measurement light having wavelengths within a first range of wavelengths to one the photodetectors and to reflect portions of the measurement light having wavelengths within a second range of wavelengths to another one of the photodetectors, where the first and second ranges of wavelengths are defined by a predetermined first reflectance/transmission transition region of the dichroic beam splitter. The optical absorption spectrometry system may further include a light source module having multiple light sources configured to emit corresponding light having wavelengths within different wavelength ranges, and a dichroic beam combiner configured to transmit portions of the corresponding light having wavelengths within a third range of wavelengths and to reflect portions of the corresponding light having wavelengths within a fourth range of wavelengths to provide the combined light. The third and fourth ranges of wavelengths are defined by a predetermined second reflectance/transmission transition region of the dichroic beam combiner.

In another representative embodiment, an optical absorption spectrometry system includes first, second and third light sources, first and second first dichroic beam combiners, and a wavelength selective module. The first light source is configured to emit first light having first wavelengths within a first wavelength range. The second light source is configured to emit second light having second wavelengths within a second wavelength range different from the first wavelength range. The third light source is configured to emit third light having third wavelengths within a third wavelength range different from the first wavelength range and the second wavelength range. The first dichroic beam combiner configured to transmit a portion of the first light and to reflect a portion of the second light to provide first combined light. The second dichroic beam combiner is configured to transmit a portion of the first combined light and to reflect a portion of the third light to provide second combined light. The wavelength selective module is configured to disperse the second combined light received at an entrance aperture, to select a sample wavelength range of the dispersed light as sample light, and to output the sample light having the selected sample wavelength range from an exit aperture for illuminating a sample.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

An optical absorption spectrometry system may be used for spectrochemical analysis of a sample, for example. Generally, according to various embodiments, the optical absorption spectrometry system includes multiple light sources having different wavelength ranges, an optical combiner for combining the light from the multiple light sources, and a spectrometer (e.g., monochromator or polychromator) for receiving the combined light. The spectrometer is configured to enable selection of a sample wavelength range of light from a combined wavelength range of the combined light. Sample light having the selected sample wavelength range illuminates a sample, providing measurement light having a measurement wavelength range (which is substantially the same as the sample wavelength range). The optical absorption spectrometry system further includes an optical splitter that splits the measurement wavelength range of the measurement light into separate portions having different wavelength ranges. The separate portions of light are directed to one or more different photodetectors configured to detect the corresponding wavelength range. The optical absorption spectrometry system is thus able to collect light of different wavelength ranges, covering a broader wavelength range than any of the multiple light sources emits and/or any of the photodetectors detects on their own.

Figure 1:
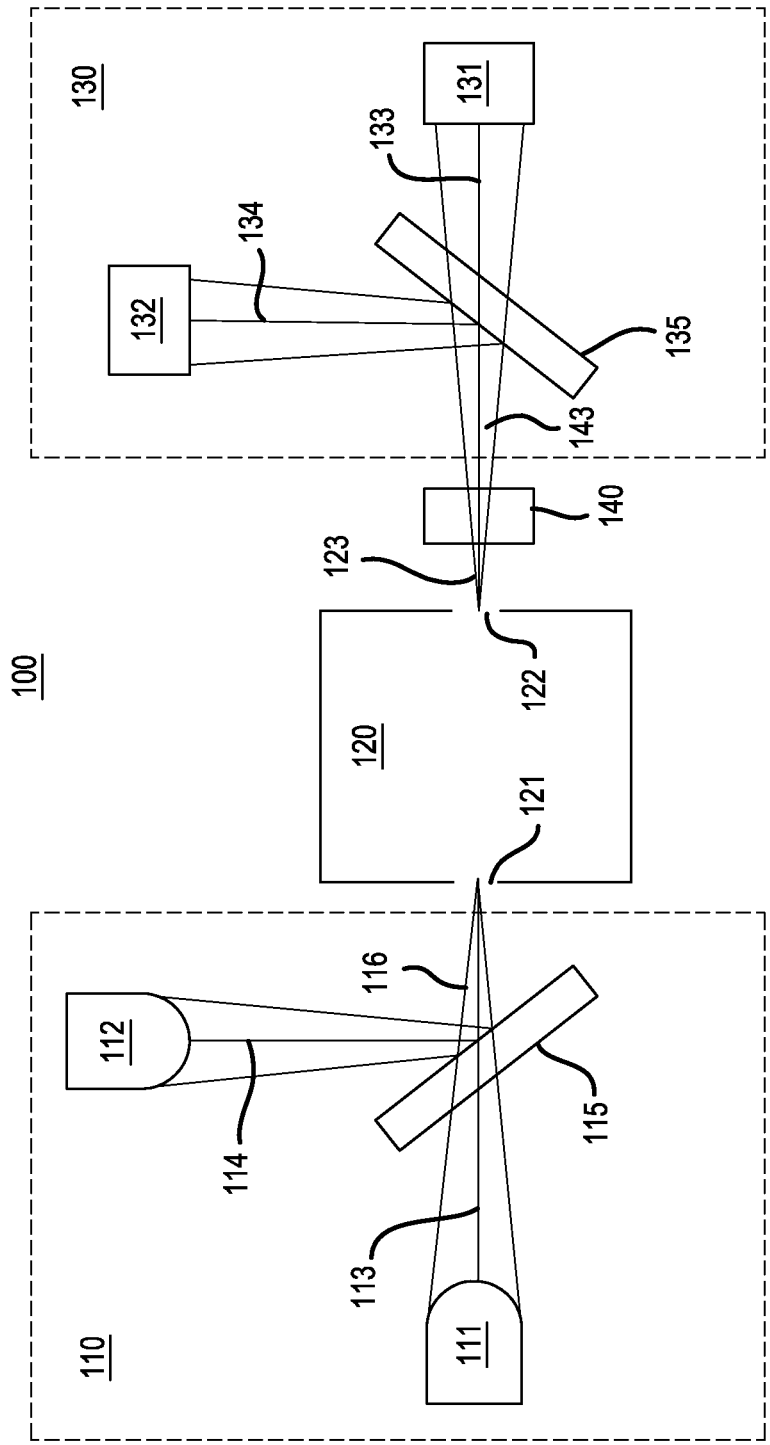
FIG. 1 is a cross-sectional view of an optical absorption spectrometry system, according to a representative embodiment.

FIG. 1 is cross-sectional view of an optical absorption spectrometry system, according to a representative embodiment.

Referring to FIG. 1, optical absorption spectrometry system 100 includes a light source module 110 configured to output combined light 116 from multiple light sources, and a wavelength selective module 120 of a spectrometer configured to receive the combined light 116 at an entrance slit or entrance aperture 121 and to output sample light 123 having a selected sample wavelength range at an exit slit or an exit aperture 122. The wavelength selective module 120 may be a monochromator or a polychromator, for example, although other means for selecting wavelengths may be incorporated without departing from the scope of the present teachings. The sample light 123 illuminates a sample in a sample cell or sample holder 140. The sample holder 140 may be configured to accommodate various types of samples, such as solid, liquid and/or gas samples. In various configurations, the sample holder 140 may be omitted if the sample otherwise can be positioned properly, e.g., in the case of some solid samples, without the need of the sample holder 140. The optical absorption spectrometry system 100 further includes a detection module 130 configured to detect measurement light 143 emitted from the sample to provide measurement results. The measurement light 143 essentially includes the sample light 123 less light absorbed by the sample. The measurement results may be converted to digital data, and provided to memory and/or a processor (not shown) for storage and analysis, respectively.

In the depicted embodiment, the light source module 110 includes a first light source 111, a second light source 112, and a dichroic beam combiner 115. The first light source 111 is configured to emit first light 113 having first wavelengths in a first wavelength range, and the second light source 112 is configured to emit second light 114 having second wavelengths a second wavelength range, where the second wavelength range is different from the first wavelength range. The dichroic beam combiner 115 receives the first light 113 from the first light source 111 via a first light path and the second light 114 from the second light source 112 via a second light path. The dichroic beam combiner 115 is configured to transmit at least a portion of the first light 113 and to reflect at least a portion of the second light 114 into the entrance aperture 121 of the wavelength selective module 120 as the combined light 116.

For purposes of illustration, the second light source 112 is positioned relative to the first light source 111 such that the second light path is substantially perpendicular to the first light path, and the dichroic beam combiner 115 is oriented at a substantially 45 degree angle with respect to the first and second light paths. Of course, the relative positioning of the first light source 111 (and corresponding first light path), the second light source 112 (and corresponding second light path), and the dichroic beam combiner 115 may be varied, e.g., to accommodate different set-ups, to adjust focus positions and/or to provide as much light from each of the first and second and third light sources 111 and 112 as possible (or to deliver as much of each wavelength range as possible to each of the first and second photodetectors 131 and 132), as would be apparent to one skilled in the art.

The dichroic beam combiner 115 includes a predetermined first reflectance/transmission transition region, such that received light is either reflected or transmitted by the dichroic beam combiner 115 depending on the relation the light wavelengths to the first reflectance/transmission transition region. For example, light wavelengths above the first reflectance/transmission transition region (i.e., longer wavelengths) may be predominantly transmitted through the dichroic beam combiner 115, while light wavelengths below the first reflectance/transmission transition region (i.e., shorter wavelengths) may be predominantly reflected by the dichroic beam combiner 115, to provide the combined light 116. Throughout this description, predominantly means greater than 50 percent of the total amount of the respective portion of light.

In this case, the dichroic beam combiner 115 transmits a first portion of the first light 113 (into the entrance aperture 121) having wavelengths above the first reflectance/transmission transition region and reflects a second portion of the first light 113 (away from the entrance aperture 121) having wavelengths below the first reflectance/transmission transition region. Likewise, the dichroic beam combiner 115 transmits a first portion of the second light 114 (away from the entrance aperture 121) having wavelengths above the first reflectance/transmission transition region and reflects a second portion of the second light 114 (into the entrance aperture 121) having wavelengths below the first reflectance/transmission transition region. Accordingly, the combined light 116 includes the first portion of the first light 113 and the second portion of the second light 114. Of course, in various embodiments, the dichroic beam combiner 115 may be configured to reflect light wavelengths above the first reflectance/transmission transition region and to transmit light wavelengths below the first reflectance/transmission transition region, without departing from the scope of the present teachings.

In an illustrative configuration, the first light source 111 may be a deuterium (D2) lamp for which the first wavelength range is approximately 190 nanometers (nm) to approximately 330 nm (e.g., ultraviolet light region), and the second light source 112 may be an incandescent lamp for which the second wavelength range is approximately 330 nm to approximately 3300 nm (e.g. visible light region), for example, resulting in a combined wavelength range of approximately 190 nm to approximately 3300 nm. In this scenario, the first reflectance/transmission transition region of the dichroic beam combiner 115 may be set at approximately 330 nm, for example, in which case substantially all of the first light 113 will be transmitted through the dichroic beam combiner 115 and substantially all of the second light 114 will be reflected by the dichroic beam combiner 115 to form the combined light 116.

Of course, the first and second light sources 111 and 112 may be implemented as various different types of light sources with corresponding different first and second wavelength ranges, without departing from the scope of the present teachings. The first and second wavelength ranges may meet or overlap, so that the combined light 116 has a substantially continuous combined wavelength range including all or part of each of the first and second wavelength ranges. In alternative embodiments, the optical absorption spectrometry system 100 may include more than two light sources, as discussed below with reference to FIG. 4.

The wavelength selective module 120 is configured to disperse the combined light 116 received at the entrance aperture 121, to select a sample wavelength range of the dispersed light, and to output the sample light 123 from the exit aperture 122 for illuminating the sample in the sample holder 140. Sample wavelengths of the sample light 123 are in the selected sample wavelength range. For example, the wavelength selective module 120 may be a monochromator having a wavelength dispersion element, such as a grating or prism, that spatially disperses wavelength components (i.e., the combined wavelengths) of the combined light 116 into dispersed light.

The wavelength selective module 120 may be configured to enable selection of a particular wavelength range (i.e., the sample wavelength range) from the dispersed light for illuminating the sample. For example, the sample wavelength range may be selected by rotating a grating or a prism of the wavelength selective module 120. For example, the wavelength selected is proportional to the sine of the angle of the grating. The size of the sample wavelength range may vary, based on application and/or design specific requirements. For example, the sample wavelength range may be approximately 1 nm to approximately 2 nm, although other sample wavelength ranges may be incorporated without departing from the scope of the present teachings. Therefore, the sample wavelength range (e.g., about 1-2 nm) of the sample light at the exit aperture 122 may be significantly narrower than the combined wavelength range (e.g., about 190-3300 nm) of the combined light at the entrance aperture 121. This enables the user to selectively apply sample light having various targeted sample wavelength ranges to the sample, simply by selecting desired dispersed wavelengths at the wavelength selective module 120.

The detection module 130 receives the measurement light 143 in response to the sample light 123 passing through the sample. In the depicted embodiment, the detection module 130 includes a dichroic beam splitter 135, a first photodetector 131 and a second photodetector 132. The dichroic beam splitter 135 is configured to receive the measurement light 143 from the sample in the sample holder 140, and to transmit a portion (third light 133) of the measurement light 143 to the first photodetector 131 and to reflect another portion (fourth light 134) of the measurement light 143 to the second photodetector 132, based on the lengths of the measurement wavelengths. Thus, the first photodetector 131 receives and detects the third light 133 and the second photodetector 132 receives and detects the fourth light 134. The first and second photodetectors 131 and 132 may be photodiodes, for example, although other types of photodetectors may be incorporated without departing from the scope of the present teachings.

Generally, the first and second photodetectors 131 and 132 convert the third and fourth light 133 and 134 to electrical signals, e.g., which may be digitized by an analog-to-digital converter (ADC) (not shown), stored in memory (not shown) and/or processed and analyzed by a processing device (not shown). For example, the processing device may be implemented by a computer processor, application specific integrated circuits (ASICs), field-programmable gate arrays (FPGAs), or combinations thereof, using software, firmware, hard-wired logic circuits, or combinations thereof. When using a processor, a processor memory may be included, such as a non-transitory computer readable medium, for storing executable software/firmware and/or executable code that allows it to perform the various functions.

The dichroic beam splitter 135 includes a predetermined second reflectance/transmission transition region, such that the received measurement light is either reflected or transmitted by the dichroic beam splitter 135 depending on the relation of the measurement light wavelengths to the second reflectance/transmission transition region. For example, the measurement wavelengths above the second reflectance/transmission transition region (i.e., longer wavelengths) may be predominantly transmitted through the dichroic beam splitter 135, while measurement wavelengths below the second reflectance/transmission transition region (i.e., shorter wavelengths) may be predominantly reflected by the dichroic beam splitter 135. Of course, in various embodiments, the dichroic beam splitter 135 may be configured to reflect measurement wavelengths above the second reflectance/transmission transition region and transmit measurement wavelengths below the second reflectance/transmission transition region, without departing from the scope of the present teachings.

The second reflectance/transmission transition region of the dichroic beam splitter 135 may be different from the first reflectance/transmission transition region of the dichroic beam combiner 115. For example, the second reflectance/transmission transition region may be set to effectively split the combined wavelength range of the combined light 116 into predetermined spectral regions. For instance, assuming that the combined wavelength range is approximately 190 nm to approximately 3300 nm, as in the example discussed above, the second reflectance/transmission transition region may be set to approximately 1100 nm. In this case, a near infrared (NIR) portion of the measurement light 143 (e.g., approximately 1100 nm to approximately 2500 nm) may be transmitted through the dichroic beam splitter 135 as the third light 133 onto the first photodetector 131 (e.g., an Indium (In)/Gallium (Ga) Arsenide (As) detector), while an ultraviolet-visible (UV-Vis) portion of the measurement light 143 (e.g., approximately 190 nm to approximately 1100 nm) may be reflected by the dichroic beam splitter 135 as the fourth light 134 onto the second photodetector 132 (e.g., a Silicon photodetector). Of course, in various embodiments, the dichroic beam splitter 135 may be configured to have a second reflectance/transmission transition region anywhere within the available spectrum, without departing from the scope of the present teachings.

Depending on the second reflectance/transmission transition region and the measurement wavelength range of the measurement light 143, all of the measurement light 143 may be transmitted to the first photodetector 131 (e.g., if the measurement wavelength range is entirely above the second reflectance/transmission transition region), or may be reflected to the second photodetector 132 (e.g., if the measurement wavelength range is entirely below the second reflectance/transmission transition region). Alternatively, if the measurement wavelength range extends across the second reflectance/transmission transition region, then the measurement light 143 is divided between the first and second photodetectors 131 and 132, as discussed above. However, according to the various embodiments, there is a progressive (smooth) transition between outputs of the first and second photodetectors 131 and 132 since the first and second light sources 111 and 112, the dichroic beam combiner 115, and the first and second photodetectors 131 and 132 all transit smoothly with wavelength, as opposed to abruptly. Thus, any difference in signal level is converted, due to overlap at the transition, from a step to a slow ramp. In contrast, using a moveable mirror, for example, the transition is abrupt, changing from 100 percent from one photodetector to 100 percent from the other detector, causing any difference in signal level to show up as a step.

Figure 2:
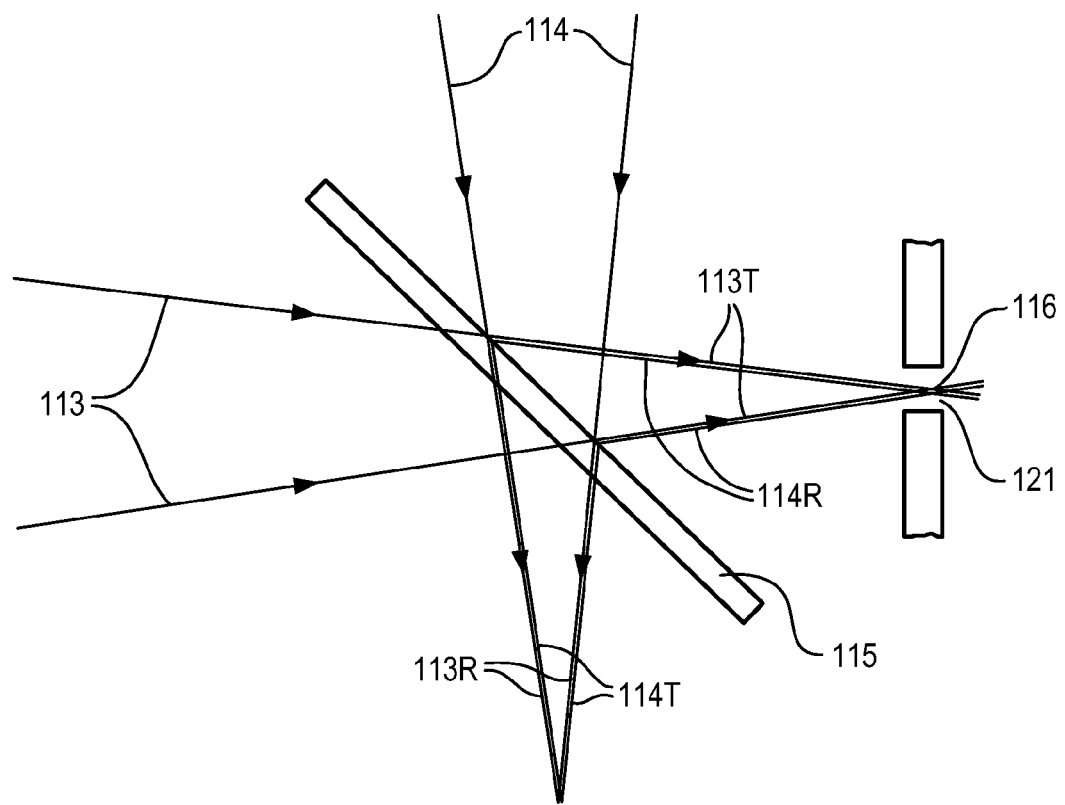
FIG. 2 is a cross-sectional view of a dichroic beam combiner of the optical absorption spectrometry system of FIG. 1, according to a representative embodiment.

FIG. 2 is a cross-sectional view of the dichroic beam combiner 115 of the optical absorption spectrometry system 100 shown in FIG. 1, according to a representative embodiment.

Referring to FIG. 2, the dichroic beam combiner 115 is tilted so that the portions of the first and second light 113 and 114 that it transmits/reflects are either directed into or away from the entrance aperture 121 of the wavelength selective module 120. More particularly, when the dichroic beam combiner 115 receives the first light 113, it transmits a transmitted portion 113T into the entrance aperture 121 and reflects a reflected portion 113R away from the entrance aperture 121 (meaning the reflected portion 113R does not enter the entrance aperture 121). When the dichroic beam combiner 115 receives the second light 114, at the same time as receiving the first light 113, it reflects a reflected portion 114R into the entrance aperture 121 and transmits a transmitted portion 114T away from the entrance aperture 121. The transmitted portion 113T and the reflected portion 114R effectively combine to provide the combined light 116.

As mentioned above, since the dichroic beam combiner 115 may be configured to transmit portions of the first and second light 113 and 114 predominately having first and second wavelengths, respectively, above the first reflectance/transmission transition region, the transmitted portion 113T of the first light 113 and the transmitted portion 114T of the second light 114 have wavelengths predominately in a first range of wavelengths above the first reflectance/transmission transition region. Likewise, since the dichroic beam combiner 115 may be configured to reflect portions of the first and second light 113 and 114 predominately having first and second wavelengths, respectively, below the first reflectance/transmission transition region, the reflected portion 113R of the first light 113 and the reflected portion 114R of the second light 114 have wavelengths predominately in a second range of wavelengths below the first reflectance/transmission transition region.

In other words, the wavelength selective module 120 generally receives longer wavelengths (e.g., in the visible region of the spectrum) of the first light 113 and shorter wavelengths (e.g., in the ultraviolet region of the spectrum) of the second light 114. Of course, in alternative embodiments, the dichroic beam combiner 115 may be configured to transmit portions of the first and second light 113 and 114 predominately having wavelengths below the first reflectance/transmission transition region, and to reflect portions of the first and second light 113 and 114 predominately having wavelengths above the first reflectance/transmission transition region, without departing from the scope of the present teachings.

Figure 3:
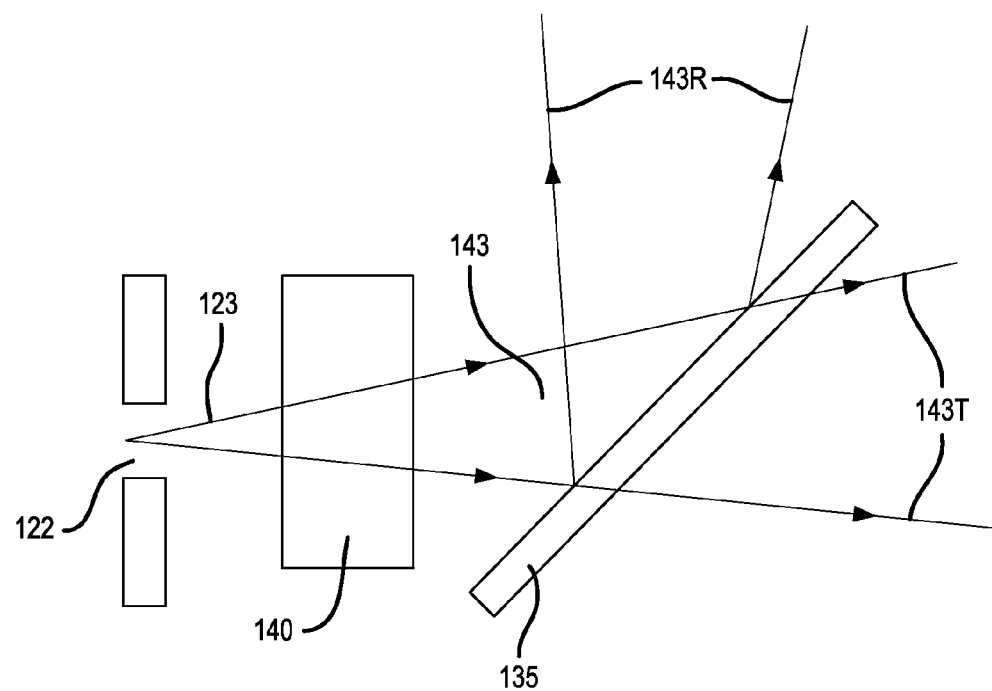
FIG. 3 is a cross-sectional view of the dichroic beam splitter of the optical absorption spectrometry system of FIG. 1, according to a representative embodiment.

FIG. 3 is a cross-sectional view of the dichroic beam splitter 135 of the optical absorption spectrometry system 100 shown in FIG. 1, according to a representative embodiment.

Referring to FIG. 3, the dichroic beam splitter 135 is tilted so that the portions of the measurement light 143 that it transmits/reflects, depending on the measurement wavelengths, are directed in different directions. More particularly, when the dichroic beam splitter 135 receives the measurement light 143, it transmits a transmitted portion 143T toward the first photodetector 131, and reflects a reflected portion 143R toward the second photodetector 132. Thus, the transmitted portion 143T effectively provides the third light 133, which is received by the first photodetector 131, and the reflected portion 143R effectively provides the fourth light 134, which is received by the second photodetector 132.

As mentioned above, since the dichroic beam splitter 135 may be configured to transmit portions of the measurement light 143 predominately having measurement wavelengths above the second reflectance/transmission transition region and to reflect portions of the measurement light 143 predominately having measurement wavelengths below the second reflectance/transmission transition region, the transmitted portion 143T has wavelengths predominately in a first range of wavelengths above the second reflectance/transmission transition region and the reflected portion 143R has wavelengths predominately in a second range of wavelengths below the second reflectance/transmission transition region.

In other words, the first photodetector 131 generally receives longer wavelengths of the measurement light 143 and second photodetector 132 generally receives shorter wavelengths of the measurement light 143. Of course, in alternative embodiments, the dichroic beam splitter 135 may be configured to transmit portions of the measurement light 143 predominately having wavelengths below the second reflectance/transmission transition region, and to reflect portions of the measurement light 143 predominately having wavelengths above the second reflectance/transmission transition region, without departing from the scope of the present teachings.

As mentioned above, various embodiments of the optical absorption spectrometry system may include more than two light sources and/or more than two photodetectors. For example, FIG. 4 is a cross-sectional view of an optical absorption spectrometry system, according to another representative embodiment, in which three light sources and three photodetectors are incorporated.

Figure 4:
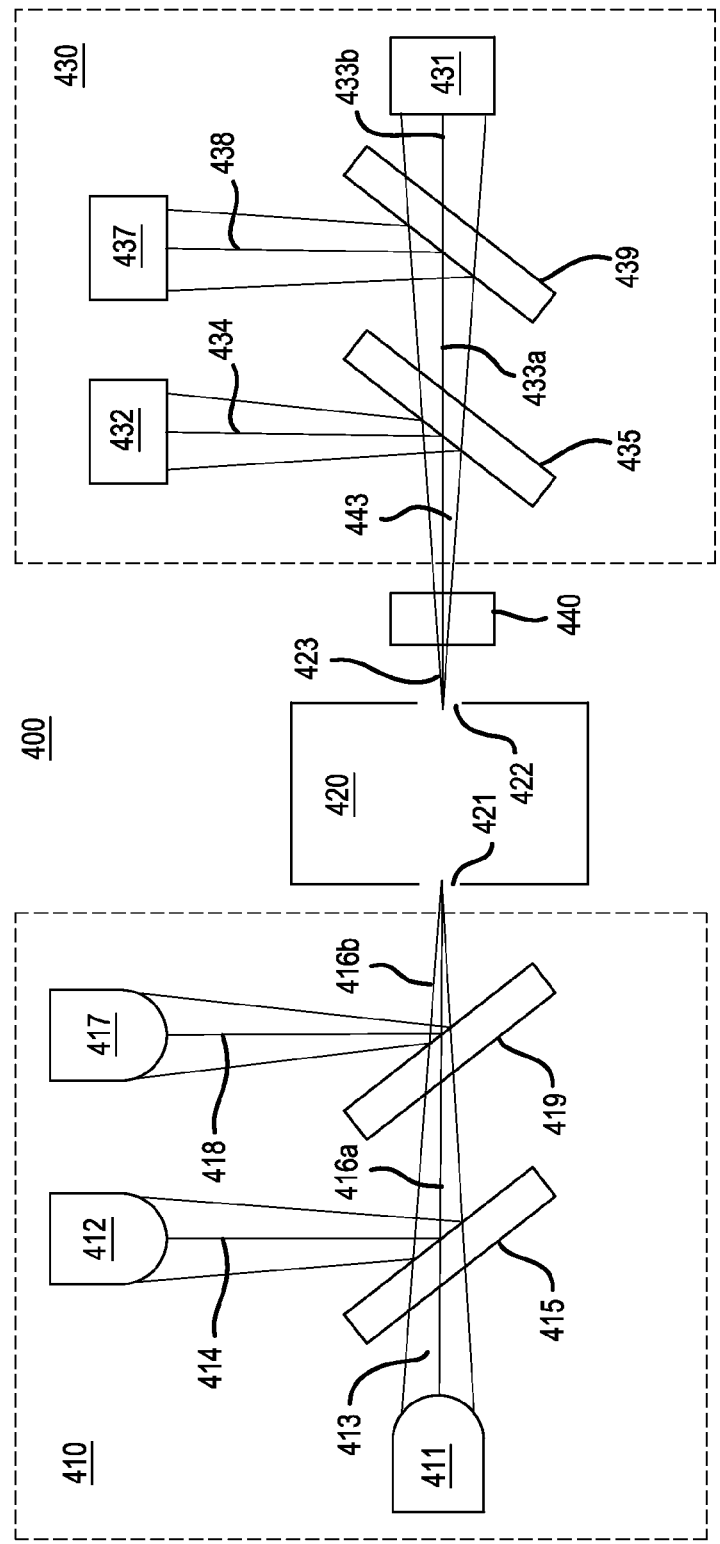
FIG. 4 is a cross-sectional view of an optical absorption spectrometry system, according to another representative embodiment.

Referring to FIG. 4, optical absorption spectrometry system 400 includes a light source module 410 configured to output second combined light 416b from multiple light sources, and a wavelength selective module 420 of a spectrometer configured to receive the second combined light 416b at an entrance slit or entrance aperture 421 and to output sample light 423 having a selected sample wavelength range at an exit slit or an exit aperture 122. The sample light 423 illuminates a sample in a sample cell or sample holder 440, which may be configured to accommodate various types of samples, such as solid, liquid and/or gas samples. The optical absorption spectrometry system 400 further includes a detection module 430 configured to detect measurement light 443 emitted from the sample to provide measurement results. The measurement light 443 essentially includes the sample light 123 less light absorbed by the sample. The measurement results may be converted to digital data, and provided to memory and/or a processor (not shown) for storage and analysis, respectively, as discussed above.

In the depicted embodiment, the light source module 410 includes three light sources and two dichroic beam combiners. More particularly, the light source module 410 includes a first light source 411, a second light source 412, a third light source 417, a first dichroic beam combiner 415 and a second dichroic beam combiner 419. The first light source 411 is configured to emit first light 413 having first wavelengths in a first wavelength range, the second light source 412 is configured to emit second light 414 having second wavelengths a second wavelength range, and the third light source 417 is configured to emit third light 418 having third wavelengths a third wavelength range, where the first, second and third wavelength ranges are different from one another.

The first dichroic beam combiner 415 receives the first light 413 from the first light source 411 via a first light path and the second light 414 from the second light source 412 via a second light path. The first dichroic beam combiner 415 is configured to transmit at least a portion of the first light 413 and to reflect at least a portion of the second light 414 to the second dichroic beam combiner 419 as first combined light 416a. Similarly, the second dichroic beam combiner 419 receives the first combined light 416a from the first dichroic beam combiner 415 via a third light path and the third light 418 from the third light source 417 via a fourth light path. The second dichroic beam combiner 419 is configured to transmit at least a portion of the first combined light 416a and to reflect at least a portion of the third light 418 into the entrance aperture 421 of the wavelength selective module 420 as the second combined light 416b.

For purposes of illustration, the second light source 412 and the third light source 417 are positioned relative to the first light source 411 such that the second and fourth light paths are substantially perpendicular to the first and third light paths. Also, each of the first dichroic beam combiner 415 and the second dichroic beam combiner 419 is oriented at a substantially 45 degree angle with respect to the first through fourth light paths. Of course, the relative positioning of the first, second and third light sources 411, 412 and 417 (and corresponding light paths), and the first and second dichroic beam combiners 415 and 419 may be varied, e.g., to accommodate different set-ups, to adjust focus positions and/or to provide as much light from each of the first, second and third light sources 411, 412 and 417 as possible (or to deliver as much of each wavelength range as possible to each of the first, second and third photodetectors 431, 432 and 437), as would be apparent to one skilled in the art.

The first dichroic beam combiner 415 includes a predetermined first reflectance/transmission transition region, such that received light is either reflected or transmitted by the first dichroic beam combiner 415 depending on the relation the light wavelengths to the first reflectance/transmission transition region. Likewise, the second dichroic beam combiner 419 includes a predetermined second reflectance/transmission transition region, such that received light is either reflected or transmitted by the second dichroic beam combiner 419 depending on the relation the light wavelengths to the second reflectance/transmission transition region. In various embodiments, the second reflectance/transmission transition region may be different from the first reflectance/transmission transition region. Functionality of reflectance/transmission transition regions is discussed above, with reference to the first reflectance/transmission transition region of the dichroic beam combine 115, and thus will not be repeated herein.

In an illustrative configuration, the first light source 411, the second light source 412 and the third light source 417 may be implemented as various different types of light sources with corresponding different first, second and third wavelength ranges, without departing from the scope of the present teachings. The first, second and third wavelength ranges may meet or overlap, so that the second combined light 116b has a substantially continuous combined wavelength range including all or part of each of the first, second and third wavelength ranges.

The wavelength selective module 420 is configured to disperse the second combined light 416b received at the entrance aperture 421, to select a sample wavelength range of the dispersed light, and to output the sample light 423 from the exit aperture 422 for illuminating the sample in the sample holder 440. The functionality of the wavelength selective module 420 is substantially the same as that of the wavelength selective module 120, discussed above, and therefore will not be repeated herein.

The detection module 430 receives the measurement light 443 in response to the sample light 423 passing through the sample. In the depicted embodiment, the detection module 430 includes a first dichroic beam splitter 435, a second dichroic beam splitter 439, a first photodetector 431, a second photodetector 432 and a third photodetector 437. The first dichroic beam splitter 435 is configured to receive the measurement light 443 from the sample in the sample holder 440, and to transmit a portion (fourth light 433a) of the measurement light 143 to the second dichroic beam splitter 439 and to reflect another portion (fifth light 434) of the measurement light 443 to the second photodetector 432, based on the lengths of the measurement wavelengths. The second dichroic beam splitter 439 is configured to receive the fourth 433a from the first dichroic beam splitter 435, and to transmit a portion (sixth light 433b) of the fourth light 433a to the first photodetector 431, and to reflect another portion (seventh light 438) of the fourth light 443a to the third photodetector 437, based on the lengths of the fourth light wavelengths. Thus, the first photodetector 131 receives and detects the sixth light 433b, the second photodetector 432 receives and detects the fifth light 434, and the third photodetector 437 receives and detects the seventh light 438. The first, second and third photodetectors 431, 432 and 437 may be photodiodes, for example, although other types of photodetectors may be incorporated without departing from the scope of the present teachings.

Generally, the first, second and third photodetectors 431, 432 and 437 convert the sixth, fifth and seventh light 433b, 434 and 438, respectively, to electrical signals, e.g., which may be digitized by an ADC (not shown), stored in memory (not shown) and/or processed and analyzed by a processing device (not shown), as discussed above. The first dichroic beam splitter 435 includes a predetermined third reflectance/transmission transition region, such that the received measurement light 423 is either reflected or transmitted by the first dichroic beam splitter 435 depending on the relation of the measurement light wavelengths to the third reflectance/transmission transition region. Likewise, the second dichroic beam splitter 439 includes a predetermined fourth reflectance/transmission transition region, such that the received fourth light 433a is either reflected or transmitted by the second dichroic beam splitter 439 depending on the relation of the fourth light wavelengths to the fourth reflectance/transmission transition region, also as discussed above.

The third reflectance/transmission transition region of the first dichroic beam splitter 435 may be different from the fourth reflectance/transmission transition region of the second dichroic beam splitter 439. Also, the third and fourth reflectance/transmission transition regions may be different from the first and second reflectance/transmission transition regions of the first and second dichroic beam combiners 415 and 419, respectively. For example, each of the third and fourth reflectance/transmission transition regions may be set to effectively split the combined wavelength range of the first combined light 416*a* into predetermined spectral regions. Of course, in various embodiments, the first and second dichroic beam splitters 435 and 439 may be configured to have a third and fourth reflectance/transmission transition regions anywhere within the available spectrum, without departing from the scope of the present teachings.

According to the various embodiments, a dichroic beam combiner may be used in an optical absorption spectrometry system to combine light from two or more separate light sources, and the combined light enters an entrance aperture of a wavelength selective module of a spectrometer. The separate light sources have different corresponding wavelength ranges, so that the combined light has an expended wavelength range that includes both of the wavelength ranges of the separate light sources. The beam combiner may be designed to have a reflectance/transmission transition region where the wavelength ranges meet or partially overlap. In this manner, moving parts for changing out and re-focusing different light sources may be eliminated from the source light path, reducing complexity and cost, and improving reliability.

Similarly, a dichroic beam splitter may be used in the optical absorption spectrometry system to split measurement light from a sample that has been illuminated by sample light (having a selected wavelength range) from an exit aperture of the wavelength selective module, providing separated light with different corresponding wavelength ranges. The separated light is directed into two or more photodetectors. For example, the separated light having larger wavelengths, above a reflectance/transmission transition region of the dichroic beam splitter, may be directed to a first photodetector, while the separated light having smaller wavelengths, below the reflectance/transmission transition region of the dichroic beam splitter, may be directed to a second photodetector. In this manner, moving parts for changing out or re-configuring different photodetectors may be eliminated from the photodetector light path, further reducing complexity and cost, and improving reliability.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. An optical absorption spectrometry system, comprising:
   a first light source configured to emit first light having first wavelengths within a first wavelength range;
   a second light source configured to emit second light having second wavelengths within a second wavelength range different from the first wavelength range;
   a dichroic beam combiner comprising a predetermined first reflectance/transmission transition region, the dichroic beam combiner being configured to transmit a first portion of the first light and to reflect a second portion of the second light to provide combined light; and
   a wavelength selective module configured to disperse the combined light received at an entrance aperture, to select a sample wavelength range of the dispersed light as sample light, and to output the sample light having the selected sample wavelength range from an exit aperture for illuminating a sample.

2. The system of claim 1, wherein the dichroic beam splitter comprises a predetermined first reflectance/transmission transition region, and
   wherein the first portion of the first light and the second portion of the second light are determined based on relations of the first wavelengths and the second wavelengths, respectively, to the predetermined first reflectance/transmission transition region.

3. The system of claim 2, wherein the first portion of the first light has first wavelengths above the predetermined first reflectance/transmission transition region, and the second portion of the second light has second wavelengths below the predetermined first reflectance/transmission transition region.

4. The system of claim 2, wherein the first portion of the first light has first wavelengths below the predetermined first reflectance/transmission transition region, and the second portion of the second light has second wavelengths above the predetermined first reflectance/transmission transition region.

5. The system of claim 2, wherein the first light source comprises an incandescent lamp and the first wavelength range is approximately 330 nm to approximately 3300 nm, and
   wherein the second light source comprises a deuterium lamp and the second wavelength range is approximately 190 nm to approximately 330 nm.

6. The system of claim 5, wherein the predetermined first reflectance/transmission transition region is at about 330 nm, such that the combined light substantially includes both the first and second wavelength ranges.

7. The system of claim 2, further comprising:
   a dichroic beam splitter configured to transmit a first portion of the measurement light and to reflect a second portion of the measurement light received from the sample, the measurement light comprising the sample light less light absorbed by the sample;
   a first photodetector configured to receive and detect the transmitted first portion of the measurement light; and
   a second photodetector configured to receive and detect the reflected second portion of the measurement light.

8. The system of claim 7, wherein the dichroic beam splitter comprises a predetermined second reflectance/transmission transition region, and
   wherein the first portion of the measurement light and the second portion of the measurement light are determined based on relations of wavelengths of the measurement light to the predetermined second reflectance/transmission transition region.

9. The system of claim 8, wherein the predetermined second reflectance/transmission transition region is different from the predetermined first reflectance/transmission transition region.

10. The system of claim 8, wherein the sample wavelength range of the sample light emitted from the exit aperture of the wavelength selective module extends from below the predetermined second reflectance/transmission transition region to above the predetermined second reflectance/transmission transition region.

11. An optical absorption spectrometry system, comprising:
    a wavelength selective module configured to disperse light received at an entrance aperture, to select a sample wavelength range of the dispersed light as sample light, and to output the sample light having the selected sample wavelength range from an exit aperture;
    a sample holder configured to contain a sample that provides measurement light when illuminated by the sample light from the wavelength selective module; and
    a detection module configured to detect the measurement light, the detection module comprising a plurality of photodetectors configured to detect corresponding light having wavelengths within different wavelength ranges, and a dichroic beam splitter configured to transmit portions of the measurement light having wavelengths within a first range of wavelengths to one of the plurality of photodetectors and to reflect portions of the measurement light having wavelengths within a second range of wavelengths to another one of the plurality of photodetectors, the first and second ranges of wavelengths being defined by a predetermined first reflectance/transmission transition region of the dichroic beam splitter.

12. The system of claim 11, wherein the wavelength selective module is a monochromator configured to enable selection of the sample wavelength range.

13. The system of claim 11, further comprising:
a light source module configured to emit combined light, the light source module comprising a plurality of light sources configured to emit corresponding light having wavelengths within different wavelength ranges, and a dichroic beam combiner configured to transmit portions of the corresponding light having wavelengths within a third range of wavelengths and to reflect portions of the corresponding light having wavelengths within a fourth range of wavelengths to provide the combined light, the third and fourth ranges of wavelengths being defined by a predetermined second reflectance/transmission transition region of the dichroic beam combiner,
wherein the wavelength selective module is configured to receive the combined light emitted by the light source module as the light received at the entrance aperture.

14. The system of claim 13, wherein the first light source comprises an incandescent lamp and the second light source comprises a deuterium lamp.

15. The system of claim 14, wherein at least one of the plurality of photodetectors comprises an Indium (In)/Gallium (Ga) Arsenide (As) photodetector for detecting a near infrared (NIR) portion of the measurement light, and at least another one of the plurality of photodetectors comprises a Silicon photodetector for detecting an ultra-violet-visible (UV-Vis) portion of the measurement light.

16. The system of claim 13, wherein the predetermined second reflectance/transmission transition region of the dichroic beam combiner is different than the predetermined first reflectance/transmission transition region of the dichroic beam splitter.

17. An optical absorption spectrometry system, comprising:
a first light source configured to emit first light having first wavelengths within a first wavelength range;
a second light source configured to emit second light having second wavelengths within a second wavelength range different from the first wavelength range;
a third light source configured to emit third light having third wavelengths within a third wavelength range different from the first wavelength range and the second wavelength range;
a first dichroic beam combiner configured to transmit a portion of the first light and to reflect a portion of the second light to provide first combined light;
a second dichroic beam combiner configured to transmit a portion of the first combined light and to reflect a portion of the third light to provide second combined light; and
a wavelength selective module configured to disperse the second combined light received at an entrance aperture, to select a sample wavelength range of the dispersed light as sample light, and to output the sample light having the selected sample wavelength range from an exit aperture for illuminating a sample.

18. The system of claim 17, wherein the first dichroic beam combiner comprises a predetermined first reflectance/transmission transition region, and the second dichroic beam combiner comprises a predetermined second reflectance/transmission transition region different from the first reflectance/transmission transition region.

19. The system of claim 18, further comprising:
a first dichroic beam splitter configured to transmit a portion of measurement light received from the sample as fourth light and to reflect a portion of the measurement light received from the sample as fifth light, the measurement light comprising the sample light less light absorbed by the sample;
a second dichroic beam splitter configured to transmit a portion of the fourth light received from the first dichroic beam splitter as sixth light and to reflect a portion of the fourth light received from the first dichroic beam splitter as seventh light;
a first photodetector configured to receive and detect the sixth light received from the second dichroic beam splitter;
a second photodetector configured to receive and detect the fifth light received from the first dichroic beam splitter; and
a third photodetector configured to receive and detect the seventh light received from the second dichroic beam splitter.

20. The system of claim 19, wherein the first dichroic beam splitter includes a predetermined third reflectance/transmission transition region, and the second dichroic beam splitter includes a predetermined fourth reflectance/transmission transition region different from the first reflectance/transmission transition region.

\* \* \* \* \*